United States Patent [19]
Webster

[11] Patent Number: 5,518,033
[45] Date of Patent: May 21, 1996

[54] VESSEL INSPECTION PLUG AND METHOD OF INSTALLING SAME IN VESSEL

[75] Inventor: James Webster, Spring, Tex.

[73] Assignee: Sepco Industries, Houston, Tex.

[21] Appl. No.: 308,672

[22] Filed: Sep. 19, 1994

[51] Int. Cl.⁶ ..................................... F16L 55/10
[52] U.S. Cl. .................. 138/90; 138/89; 138/92
[58] Field of Search ....................... 138/89, 90, 92, 138/94; 220/307, 352

[56] References Cited

U.S. PATENT DOCUMENTS

| | | |
|---|---|---|
| 1,363,153 | 12/1920 | Murray ........................................ 138/92 |
| 3,233,775 | 2/1966 | Bozek . |
| 3,658,096 | 4/1972 | Higuera . |
| 3,827,462 | 8/1974 | Celesta . |
| 4,091,842 | 5/1978 | Greenwalt et al. . |
| 5,014,866 | 5/1991 | Moore ........................................ 138/90 |
| 5,351,718 | 10/1994 | Barton ........................................ 138/92 |

Primary Examiner—James E. Bryant, III
Attorney, Agent, or Firm—Robert C. Curfiss; Butler & Binion

[57] ABSTRACT

An inspection plug assembly includes an elastomeric outer sleeve which may be compressed into the skin of an insulating jacket for forming a seal between the assembly and the jacket by mechanically anchoring the assembly to the jacket, without requiring the use of adhesives. The plug includes pull tabs to facilitate removal of the plug from the sleeves. A lanyard may be attached to the plug and the jacket without disturbing the sealing function.

9 Claims, 1 Drawing Sheet 5,518,033

VESSEL INSPECTION PLUG AND METHOD OF INSTALLING SAME IN VESSEL

BACKGROUND OF THE INVENTION

1. Field of the Invention

The subject invention is generally related to resealable sealing assemblies and is specifically directed to an improved vessel inspection plug and assembly including an elastomeric plug and a receptive sleeve.

2. Discussion of the Prior Art

Many types of vessels and storage containers require periodic inspection for early detection of corrosion, deterioration of wall thickness and the like. In many typical installations, the vessels are insulated, making visual inspection of the outer surface difficult and impractical without disturbing the insulation. Typically, inspection holes are cut into the insulation to permit inspection. The holes then must be closed and resealed upon completion of inspection. Over the years, resealable sealing assemblies have been developed that permit permanent inspection holes to be cut into the insulation layer, with the assemblies being removable for inspection and resealable upon completion.

An example of a resealable sealing assembly is disclosed in U.S. Pat. No. 4,091,842, entitled: "Resealable Sealing Assembly for Inspection Port Hole", issued to E. L. Greenawalt, et al on May 10, 1978. As there disclosed, the sealing assembly includes a rigid sleeve which is permanently installed in the insulation port hole and a removable plug made of a compressible elastomeric material which, when inserted in the rigid sleeve, forms a weatherproof seal. This assembly has gained widespread acceptance throughout the industry and is applicable in a wide variety of textures of insulation from very soft and flimsy to hard. A weatherproof, adhesive-sealant is used to bond the sleeve to the insulation. An annular bulge is created in the sleeve to further mechanically bond the sleeve to the insulation.

While the resealable sealing assembly of the prior art has been widely accepted, it is not readily useful in applications where the insulation layer is of a ribbed or corrugated configuration. In addition, removal of the plug from the sleeve is somewhat cumbersome, particularly due to the excellent sealing characteristics of the assembly.

Other resealable assemblies are disclosed in U.S. Pat. No. 3,827,462, entitled: "Insulating Plug", issued to J. J. Celesta on Aug. 6, 1974; U.S. Pat. No. 3,658,096, entitled: "Insulating Plug", issued to R. E. Higuera on Apr. 25, 1972 and U.S. Pat. No. 3,233,775, entitled: "Flexible Plastic Plug", issued to J. S. Bozek on Feb. 8, 1966. None of the disclosed assemblies is readily adaptable for use with a ribbed or corrugated insulation jacket.

Therefore, there is a need for an improved sealing assembly that is readily adaptable to both smooth and ribbed insulation configurations and for an improved plug which is easy to remove and replace in the assembly.

SUMMARY OF THE INVENTION

The subject invention is directed to an improved inspection plug assembly including a sleeve adapter particularly well suited for corrugated or ribbed insulation jacketing and a tabbed plug for ease of removal. The plug is also permanently attached to the system assembly, minimizing risk of misplacement during an inspection. It is an added advantage that the assembly of the subject invention may be installed in a rigid wall system, whether or not corrugated, without the use of the heretofore required adhesive.

In the preferred embodiment of the invention, the inspection plug assembly includes a rigid, initially cylindrical inner sleeve, a compressible plug adapted to be snugly fit in the inner sleeve and an elastomeric outer sleeve surrounding the outer circumferential surface of the inner sleeve. In the preferred embodiment, the inner sleeve has a lip, against which the elastomeric sleeve is seated. Preferably, the outer sleeve includes a circumferential ridge adapted to seat firmly against the lip, with the upper end of the sleeve received in the lip. It is desirable to provide tabs on the plug to facilitate easy removal. In the preferred embodiment, a tether may be attached to one of the tabs, with an opposite end attached to the jacket for minimizing risk of misplacement of the plug during inspection.

The sealing assembly is mounted in the insulation jacket by cutting a through hole in the insulation the nominal size of the outer sleeve when the outer sleeve is positioned on the inner sleeve. The through hole exposes the vessel wall for inspection. The assembled inner and outer sleeve are then inserted in the hole, with a portion of the outer sleeve above and a portion of the outer sleeve below the corrugated jacket or skin of the insulation. In the preferred embodiment, the ridge on the outer sleeve may be firmly seated against the corrugated jacket. A portion of the inner sleeve, inside the jacket is then hydraulically expanded to anchor the sleeves in the hole. The elastomeric outer sleeve bites into the corrugated wall to provide a water-tight seal between the sleeves and the jacket. Removed insulation may then be placed in the hole and covered with the plug which is inserted in the sleeve. The plug may now be removed as required in order to perform periodic inspections.

It is, therefore, an object and feature of the subject invention to provide an improved inspection plug assembly which is ideally suited for use with corrugated or ribbed insulation jackets.

It is another object and feature of the subject invention to provide an inspection plug assembly wherein the water tight seal between the plug assembly and the insulation jacket can be achieved without the use of adhesive bonds.

It is a further object and feature of the subject invention to provide for an enhanced inspection plug with easy removal tabs and a lanyard system for securing the plug to the final assembly.

DETAILED DESCRIPTION OF THE PREFERRED EMBODIMENT

Figure 1:
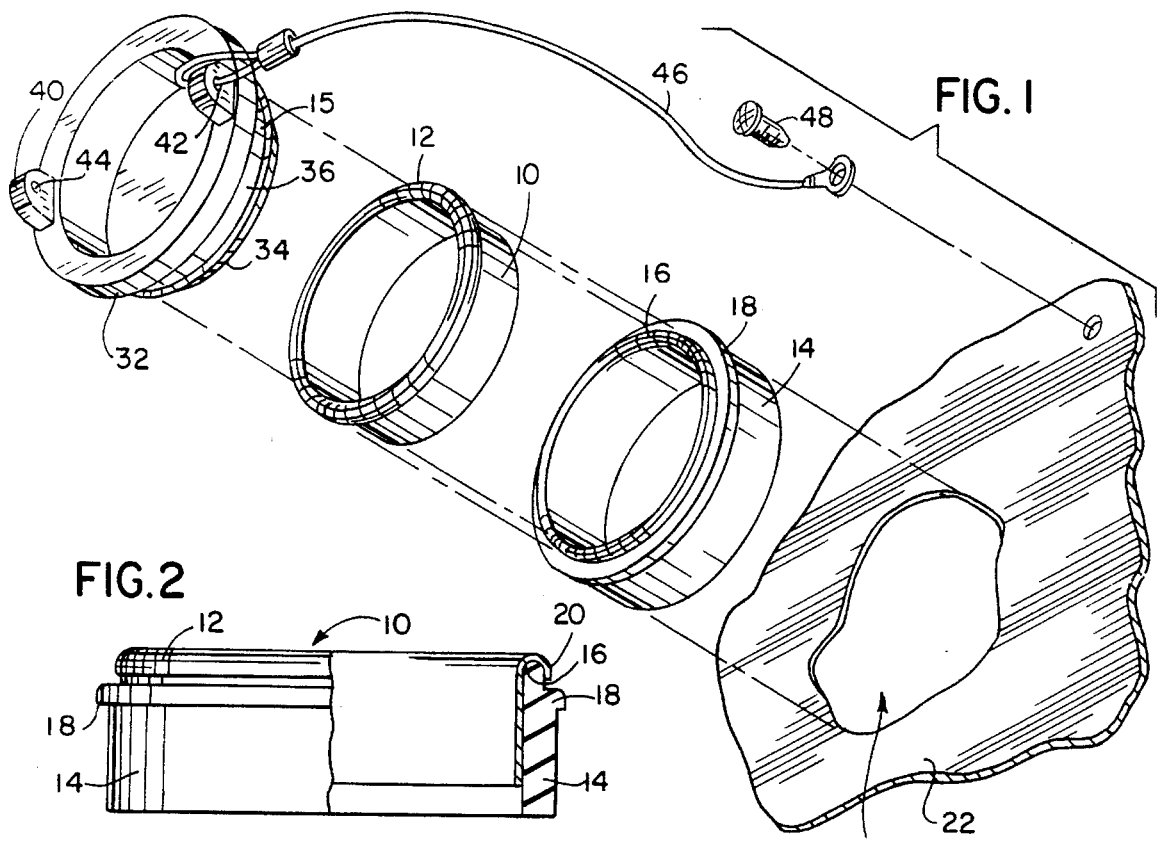
FIG. 1 is an exploded perspective view of the inspection plug and sleeve assembly.

The preferred embodiment of the subject invention includes the plug and sleeve assembly as shown in FIG. 1. Specifically, the assembly includes a rigid inner sleeve 10, made of a substantially rigid, ductile material which is preferably cold-formable, such as, by way of example, aluminum, an outer sleeve 14 and a plug 15. The sleeve 10 is essentially a hollow cylinder which has an annular lip 12, formed at the outer end of the sleeve. The outer lip is expanded sufficiently that it cannot pass through the hole in the insulating jacket.

The outer sleeve 14 is also generally a hollow cylinder with an inside diameter dimensioned to snugly fit over the outer wall of the inner sleeve 10. Typically, the outer sleeve is made of a compressible elastomeric material having a durometer as measured on Shore "A" scale of from about 20 to 60, and more preferably having a durometer of from about 35 to 45. Examples of suitable elastomeric materials are Silastic brand silicon rubbers, flexible polyurethane, Viton brand, Neoprene brand and other synthetic rubbers.

In the preferred embodiment, the upper end of the outer sleeve 14 includes a radius 16 adapted to slide into the lip 12 of the inner sleeve. A peripheral ridge 18 is positioned under the radius 16 and is adapted to be seated adjacent the lower, outer edge 20 of the lip. This ridge assures that the inner sleeve 14 does not slip through the hole in the insulation jacket during the installation procedure.

Figure 2:
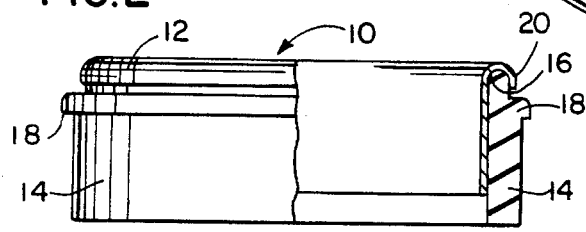
FIG. 2 illustrates the inner and outer sleeves assembled for insertion in the hole of an insulating jacket.
Figure 3:
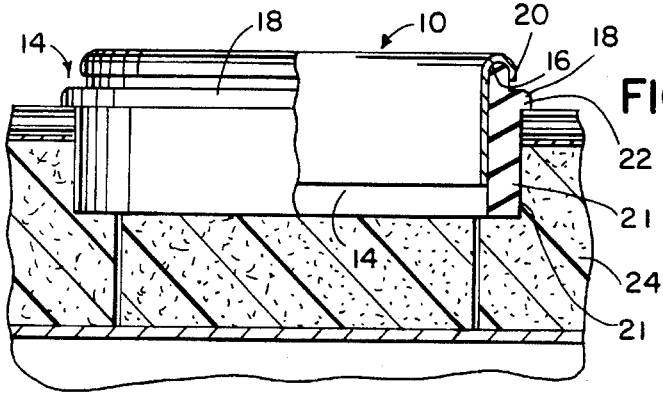
FIG. 3 is a view showing the sleeves positioned in the hole of an insulating jacket and ready to be anchored therein.
Figure 4:
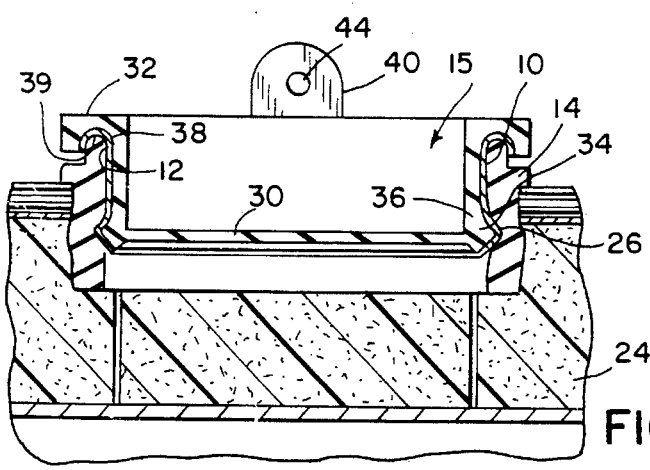
FIG. 4 shows the sleeves as finally assembled and anchored in the hole of an insulating jacket, with the plug in the assembly and tethered to the jacket.
Figure 5:
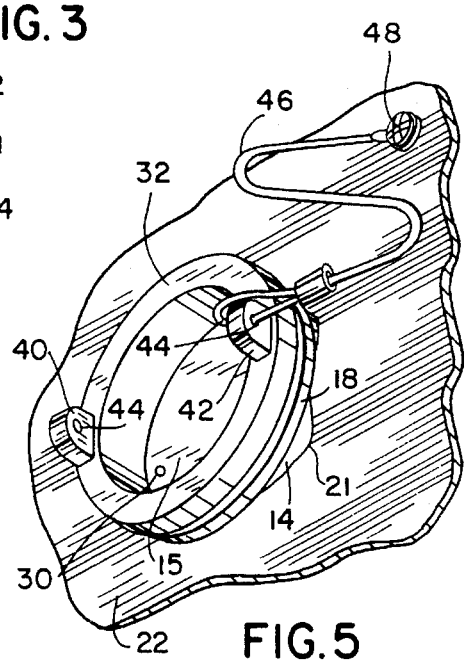
FIG. 5 is a view similar to FIG. 1, showing the assembled inspection plug and sleeve assembly installed in the wall of a vessel.

The assembly is now ready to be installed in a suitable mounting hole 21 provided in the skin of a typical insulation jacket 22, as best shown in FIG. 5. As shown in FIG. 3, the insulation jacket generally comprises a rigid or semi-rigid outer skin for sheathing a layer of insulation 24. In the illustrated embodiment, the skin 22 is ribbed or corrugated, but the invention is equally suited for smooth rigid skin application. The nominal size of the mounting hole 21 is slightly larger than outer peripheral surface of the outer sleeve 14, permitting a contacting, sliding fit of the outer sleeve, inner sleeve assembly of FIG. 2 into the hole 21. Typically, the mounting hole 21 is cut at the installation site at the time of installation, using a hole cutting tool or similar device. The insulation behind the jacket 22 and within the hole is then removed. The assembled inner and outer sleeves 10 and 14 are then inserted in the hole, as shown in FIG. 3. After insertion of the sleeve assembly into the hole 21, an annular bulge 26 is formed in the rigid wall of inner sleeve 10, as shown in FIG. 4. This also expands the elastomeric sleeve 14. This bulge 26 can be formed by any of several means. Preferably, the material from which sleeve 10 is formed can be cold formed in place using a hand held hydraulic expander.

Using cold formable materials has the advantage of being able to use hand tools and low temperatures in forming the annular bulge 26. Such an advantage is particularly useful in the subject application, and provides an added safety feature particularly where sparks or fires are not desirable. Of course, where such issues do not create safety risks, heat reactive materials such as thermoplastics may be substituted for cold formable alloys and the like.

The bulge 26 firmly anchors the sleeve assembly in the jacket by clamping it between the sleeve lip 12 and the bulge. The elastomeric outer sleeve 14 fills any gap between the inner sleeve 10 and the jacket 22 and is deformed sufficiently to fill any voids and form a water tight seal between the sleeve assembly and the insulating jacket. This configuration and assembly eliminates the requirement for an adhesive bonding agent in order to form a water tight seal between the sleeve and the jacket. However, it will of course be understood that, an adhesive bond such as that disclosed in the aforementioned U.S. Pat. No. 4,091,842 could be used in combination with the assembly of the subject invention where a secondary or back-up seal is desired.

Once the bulge 26 is formed, and the sleeve assembly is firmly anchored in the hole 21 of the jacket 22, the insulation removed from the hole may be replaced and the plug 15 may be inserted in the sleeve to close and seal the hole. The plug 15 is an essentially hollow, one-piece cylinder having a diaphragm 30, an annular lip 32 and an annular cleat 34. The plug 15 may be molded into a single piece from an elastomeric material, such as Silastic brand silicon rubber or the like. The outside diameter of the plug wall 36 between lip 32 and cleat 34 is sufficiently small so as to fit within the sleeve 10 once the sleeve is anchored in the hole 21 of the insulating jacket 22. It is not essential that there be full contact between the plug wall 36 and the sleeve 10, since this area is not relied upon to provide the seal between the plug and the sleeve.

The diaphragm 30 prevents passage of air and/or moisture through the interior of the plug 15. It can be located any where along the wall 36 of the plug and, as here shown near the cleat 34, merely as a matter of design choice, and to facilitate ease of insertion of the plug in and removal of the plug from the sleeve 10. The annular lip 32 extends outwardly from the top of the side wall 36 of the plug in a generally radial direction. The size and shape of the lip is not critical, except for the lower wall 38 which is concave formed to define a channel 39 which is adapted to fit over and receive the annular lip 12 of the sleeve 10. This forms one of the sealing surfaces between the plug and the sleeve assembly.

The annular cleat 34 protrudes generally radially outward from the wall 36 of the plug, and is preferably, although not necessarily, located near the bottom of the plug wall. The specific shape of the cleat is not critical, other than that it is adapted to be compressed into the channel in the sleeve 10 which is formed by the bulge 26. Specifically, the bulge channel provides a surface for receiving and compressing the cleat 34 when the plug 15 is fully inserted in the sleeve with the plug lip 32 properly seated and sealed against sleeve lip 12. The formation of the bulge/cleat surface to surface seal is accomplished by having the interior diameter of the sleeve bulge channel 26 sufficiently smaller than the outside diameter of the plug cleat 34. Thus, when the elastomeric plug 15 is inserted and seated in the rigid sleeve 10, the cleat 34 is compressed and deformed within the bulge channel so that its surface tightly mates with the interior surface of the sleeve.

The location of the cleat 34 relative to the top of the plug lip 32 is slightly more than the distance between the plug cleat 34 and the top of the curve of radius on the inner wall of the lip. This causes the plug wall 36 to pull downwardly on the lip 32 when the cleat is inserted in the bulge channel, stretching the plug lip 32 over the sleeve lip 12, thereby forming a second surface to surface seal between the plug and the sleeve. A very stable weather proof overall seal is formed between the plug 15 and the sleeve 10 by use of the dual sealing system.

The preferred plug embodiment of the subject invention includes a pair of extended tabs 40, 42 formed in and projecting outwardly from the plug lip 32. As best seen in FIG. 5, the tabs may be grasped between the fingers and thumbs in order to facilitate removal of the plug from the sleeve. Where desired, a through hole 44 may be provided in either or both of the tabs, permitting a tether line or lanyard 46 to be attached to the plug without disturbing the sealing integrity of the plug. The free end 48 of the lanyard may be suitably secured to the jacket 21, minimizing risk of misplacing the plug during an inspection operation.

While certain features and embodiments of the invention have been disclosed in detail herein, it will be understood that the invention includes all modifications and enhancements within the scope and spirit of the following claims.

What is claimed is:

1. A resealable sealing assembly located in a cylindrically shaped inspection hole cut in skin-covered insulation, the assembly comprising:
   a. a cylindrically shaped plug made of an elastomeric material;
   b. a rigid, formable, cylindrically shaped, hollow inner sleeve adapted for receiving the plug; and
   c. a compressible outer sleeve adapted to receive the inner sleeve, said outer sleeve made of an elastomeric material, the inner and outer sleeves being positioned in the inspection hole and secured therein by expanding a portion of the inner sleeve and compressing the outer sleeve between the inner sleeve and the skin-covered insulation.

2. The assembly of claim 1, the inner sleeve further including an annular lip extending outwardly at the sleeve top and the outer sleeve having an upper end adapted to be received within the annular lip.

3. The assembly of claim 2, the inner sleeve further including a peripheral rim positioned outside the inner sleeve annular lip when the upper end of the outer sleeve is in the annular lip.

4. The assembly of claim 1, the plug further including a pull tab extending outwardly from the plug for facilitating removal of the plug from the sleeve.

5. The assembly of claim 4, further including a lanyard attached to the pull tab and having a free end adapted to be secured to the skin-covered insulation.

6. The assembly of claim 3, an enlarged bulge being formed in the inner sleeve for clamping the insulation skin between the inner sleeve annular lip and the bulge with the outer sleeve compressed into the skin to form a water tight seal.

7. The assembly of claim 6, the plug further including a peripheral cleat adapted to be received in and compressed into the bulge of the inner sleeve.

8. The assembly of claim 7, the plug further including an annular lip having a channel adapted for receiving the annular lip of the inner sleeve, such that the plug annular lip is stretched and firmly held against the outer sleeve when the cleat is compressed into the bulge.

9. A method for anchoring an inspection plug assembly of the type having a sleeve and a plug in an inspection hole of the skin of a skin covered insulation, comprising the steps of:
   a. cutting a suitable inspection hole in the skin;
   b. placing an elastomeric, deformable sleeve over an inspection plug sleeve;
   c. inserting the assembled sleeves in the hole; and
   d. forming a bulge in the inspection plug at the site, for mechanically anchoring the sleeve in the hole, and for compressing the elastomeric, deformable sleeve into the skin for forming a seal therebetween.

* * * * *